July 17, 1956  W. L. LEWIS  2,755,041
AIRCRAFT LANDING GEAR
Filed Oct. 25, 1954  4 Sheets-Sheet 2
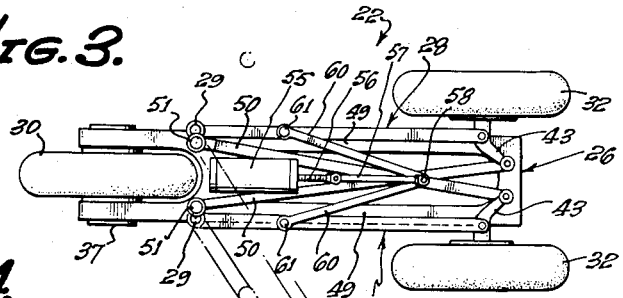
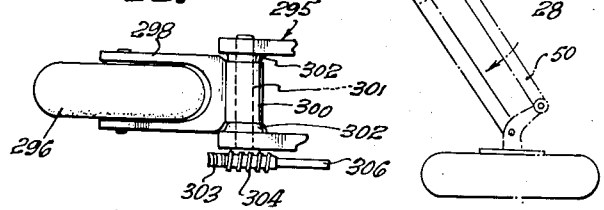
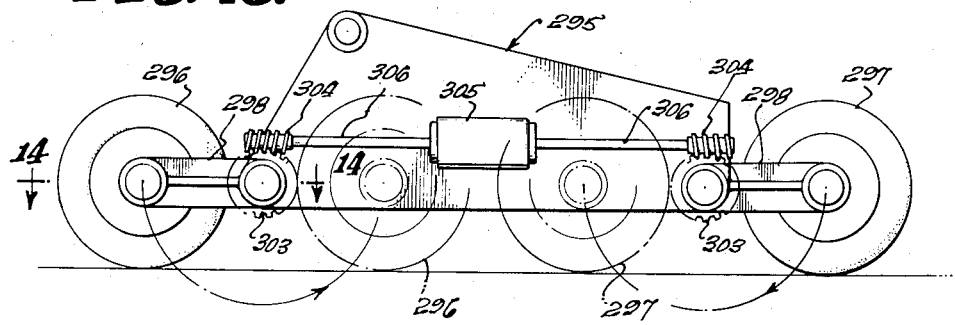
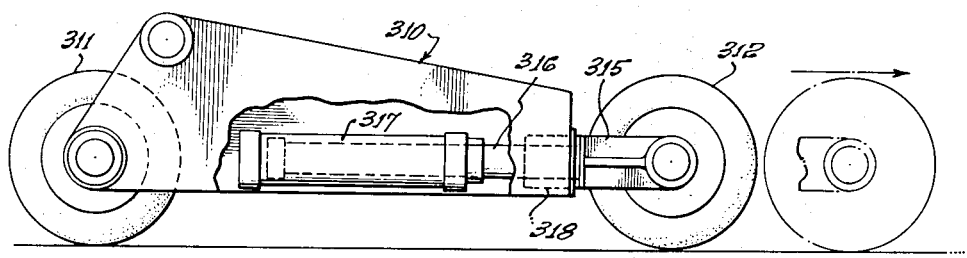
WILLIAM L. LEWIS,
INVENTOR.
BY *Jas M Roberts*
ATTORNEY.

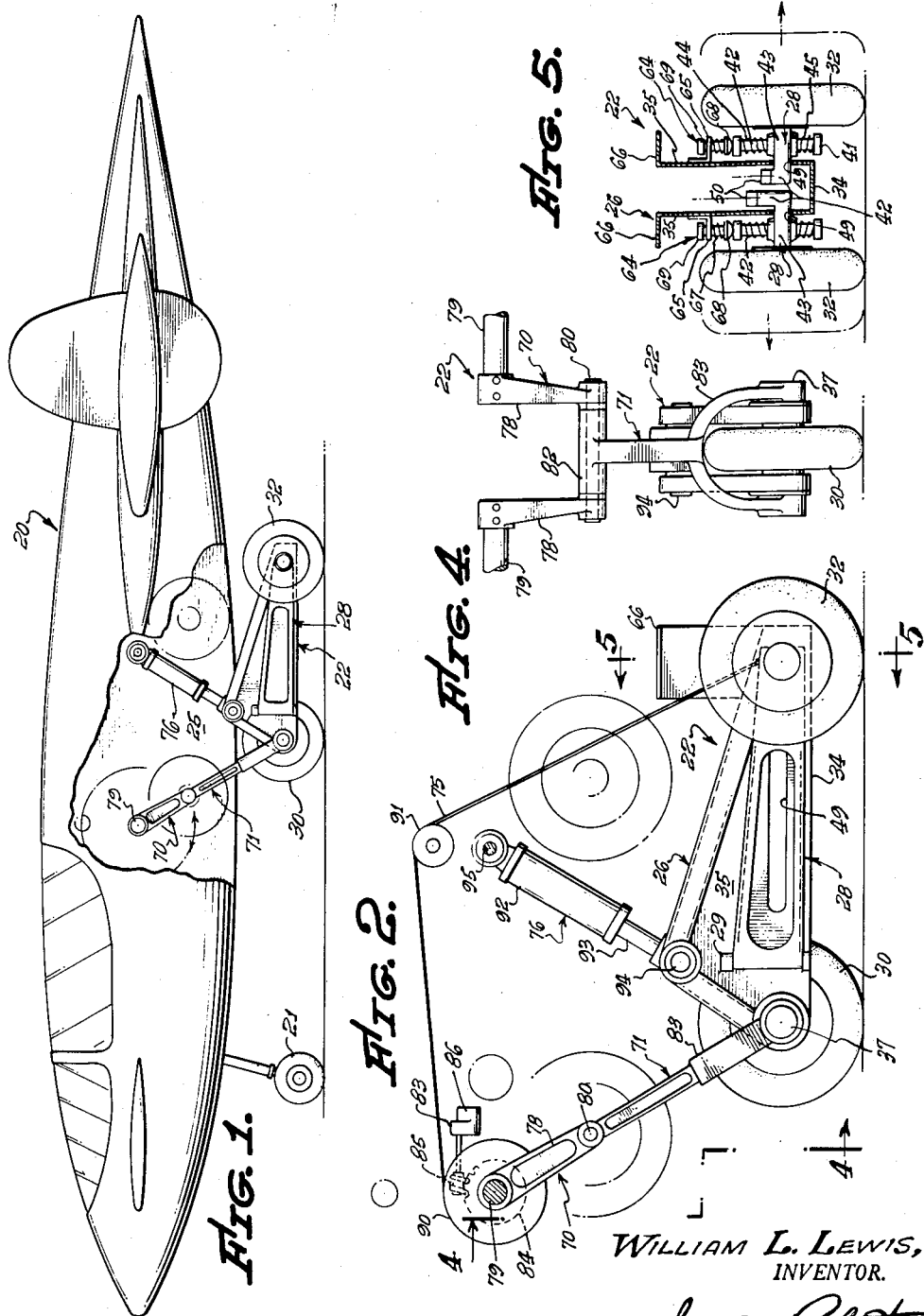

July 17, 1956　　　W. L. LEWIS　　　2,755,041
AIRCRAFT LANDING GEAR
Filed Oct. 25, 1954　　　　　　　　　　　　　　　　4 Sheets-Sheet 3

WILLIAM L. LEWIS,
INVENTOR.

BY *Jack M. Roberts*

ATTORNEY.

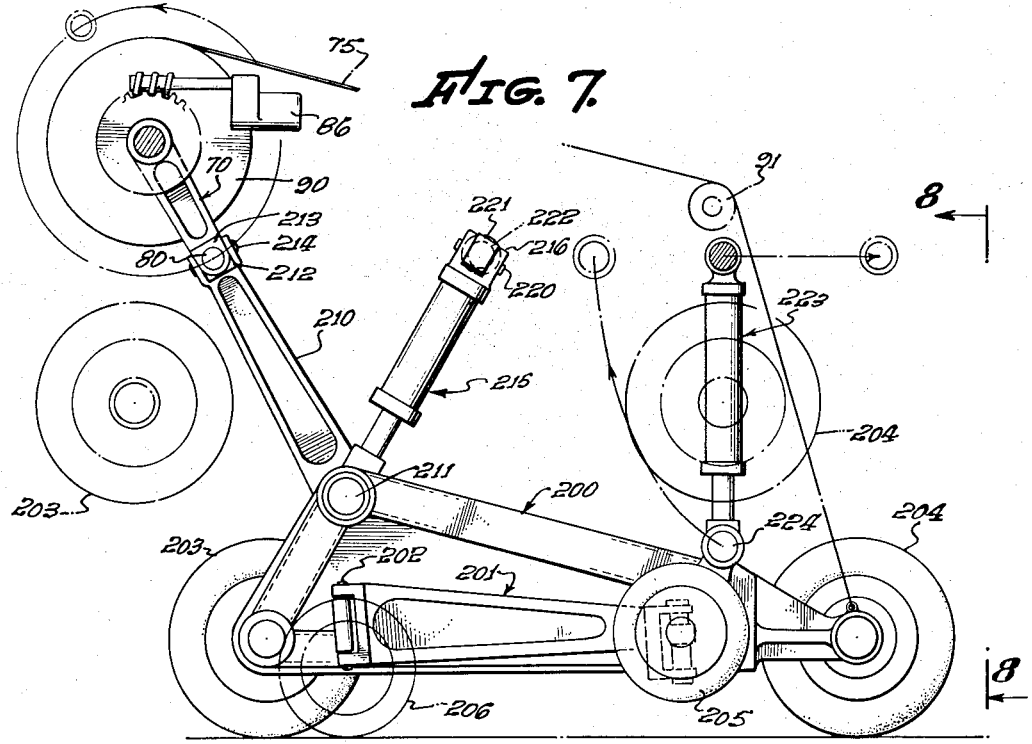
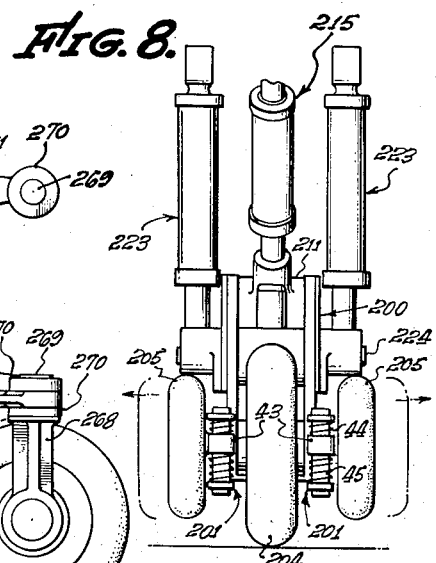
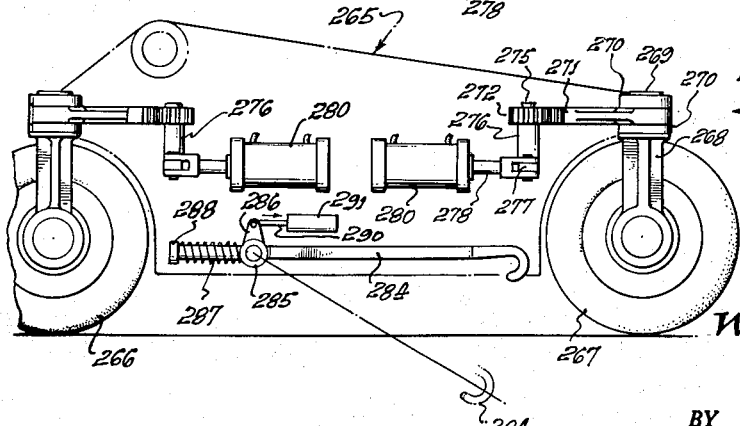

2,755,041

AIRCRAFT LANDING GEAR

William L. Lewis, Glendale, Calif.

Application October 25, 1954, Serial No. 464,345

25 Claims. (Cl. 244—102)

This invention relates to landing gear for aircraft and has for its broad object the provision of a landing gear on the body of an aircraft to replace the usual landing gear structure mounted on the wings of the aircraft.

In general this object is attained by providing a central landing gear unit that is not only extendible downward from the interior of the body of the aircraft but is also extendible laterally in both directions to provide a support base of sufficient width for lateral stability of the aircraft at rest on the ground. In some practices of the invention the landing gear is also extendible forward and/or rearward for increased longitudinal stability.

This concept of a central landing gear capable of being retracted compactly into the aircraft body and capable of being first extended downwardly and then laterally in both directions permits striking simplicity in the landing gear structure and substantial reduction in over-all weight. One central landing gear unit replaces two wing landing gear units and in some practices of the invention may additionally replace a forward nose wheel. The problem of folding wheel struts into the cramped space provided by wings is avoided, this problem becoming increasingly serious with thinner wings required for low drag, long range high speed and supersonic flight. Also avoided is the problem of making landing gear attachments to a thin wing structure with sufficient provision for distribution of landing stresses. In addition, a centralized landing gear eliminates the problem of incorporating landing gear doors and panels in wing structures and avoids the weakening of the wing structure by such openings. The excessive weight involved in the use of two or more wing landing gear units on an aircraft may be appreciated when it is considered that each of the units must be designed to be capable of withstanding all of the shock loads arising when only one wheel at a time contacts the ground in the landing of the aircraft.

Centralization of the landing gear on the body of the aircraft instead of on the two wings greatly promotes safety in the operation of an aircraft carrying personnel. When an aircraft has landing gear units on each wing in addition to a nose unit, failure of any one of the three may have serious consequences; and, of course, there is greater possibility of one unit out of three failing than there is for a single unit, especially since centralization on the body of the aircraft makes it possible not only to simplify the landing gear mechanism but also to design for greater strength and reliability. It is seldom possible to cross-connect two landing gear wing units in a positively interlocked manner for the sake of safety but, of course, no such problem arises when a single landing gear unit is used. Another safety feature is that in an aircraft having wing-mounted engines shifting the landing gear from the wings eliminates the possibility of the wheels of the landing gear throwing gravel and rocks into propellers and engines in the course of landing or take-off, such a possibility being especially serious in the possibility of damaging jet engines.

It is less hazardous to land an aircraft of the present type with a single central landing gear structure than it is to land a conventional aircraft with widely separated landing gear units on the wing. With widely separated landing wheels only a moderate side tilt will raise one wheel much higher than the other and the pilot must have this fact well in mind. Moreover, brake failure is less hazardous, and there is no possibility for ground looping when the landing wheels are all part of a single central unit. It is also to be noted that when a landing hook is utilized to brake the forward movement of an airplane on an aircraft carrier or on a short landing field, less hazards are involved with better distribution of stresses and with less possibility of structural damage when the landing hook is mounted on a central landing gear instead of on a portion of the aircraft body. A further feature with regard to safety that is made possible by the invention is the designing of the landing gear for downward extension in a "fail-safe" manner with the downward extension movement assisted both by gravity and by the force resistance of the air stream.

A further important advantage of the invention is that the centralization of the landing gear makes possible a landing gear that is in itself superior both in construction and performance. All the stresses involved in landing and take-off are ultimately transmitted to the body of the aircraft and mounting the landing gear directly on the aircraft body naturally results in greatly improved construction in this respect, especially in the wing structure. There is a further advantage, in that the placing of the landing gear on the body of the aircraft always makes it possible to use long-stroke hydraulic shock absorbers, which is seldom possible in the wings of an aircraft. The relatively slow action of long-stroke shock-absorber struts results in soft, gentle landings. A further feature of some practices of the invention is the provision of steerable landing wheels that may be turned so as to negotiate cross wind landings.

The use of a centralized landing gear is further advantageous in making possible better design of the aircraft itself apart from the landing gear structure. Removing the usual landing gear units from the wings eliminates sources of air disturbances and makes available maximum undisturbed wing area for lift. Another result is that it makes possible optimum positioning of the wing since the wing and landing gear are separate.

A feature of the preferred practice of the invention is the provision of a control system for the landing gear that is foolproof and is also automatic in certain important respects. Thus in the preferred practice of the invention the landing gear unit cannot be vertically retracted into the aircraft body unless it is first laterally retracted to compact dimensions for fitting into the aircraft body. The brake system for the landing gear is functionally related with the control system to result in a mode of operation in which after the landing gear has been extended downward, the landing gear wheels will automatically expand laterally in both directions in response to brake operation. Thus the landing gear will not ordinarily be spread laterally unless contact with the ground has been made.

A further feature of the preferred practice of the invention is the inclusion in the landing gear control system of means responsive to the weight of the aircraft imposed on the landing gear to make the control system inherently incapable of retracting the landing gear while the aircraft is on the ground. All of the wiring of the control system that is involved in raising and lowering the landing gear and which, therefore, carries relatively heavy energizing current, is well protected inside the body of the aircraft and only the wiring that carries the lighter energizing current for expanding the landing gear side wheels is carried to the underside of the body and to the landing gear structure. Thus the wiring that is of primary importance in the control system is well protected at all times.

The various objects, features and advantages of the invention will be apparent in the following description, considered with the accompanying drawings:

In the drawings, which are to be regarded as merely illustrative:

Fig. 1 is a side elevation of an aircraft equipped with a landing gear unit embodying the invention, parts being broken away to reveal concealed structure;

Fig. 2 is a side elevation on a larger scale of the landing gear unit shown in Fig. 1;

Fig. 3 is a largely schematic plan view of the landing gear unit;

Fig. 4 is an end elevation of a crank-actuated linkage for raising and lowering the front end of the landing gear frame, the linkage being shown as seen along the line 4—4 of Fig. 2;

Fig. 5 is a cross-section of the landing gear unit taken along the line 5—5 of Fig. 2;

Fig. 7 is a side elevation of a second landing gear unit embodying the invention;

Fig. 8 is an end elevation of the landing gear unit as viewed along the line 8—8 of Fig. 7;

Fig. 11 is a side elevation of a girder and wheel assembly that may be substituted for the girder and wheel assembly in the landing gear unit shown in Fig. 7;

Fig. 12 is a plan view of a portion of the mechanism in Fig. 11;

Fig. 13 is a side elevation of a second girder and wheel assembly that may be substituted in the landing gear unit shown in Fig. 7;

Fig. 14 is a plan view of an end portion of the assembly shown in Fig. 13; and

Fig. 15 is a side elevation with portions broken away showing a third girder and wheel assembly that may be substituted in the landing gear unit shown in Fig. 7.

Figure 9:
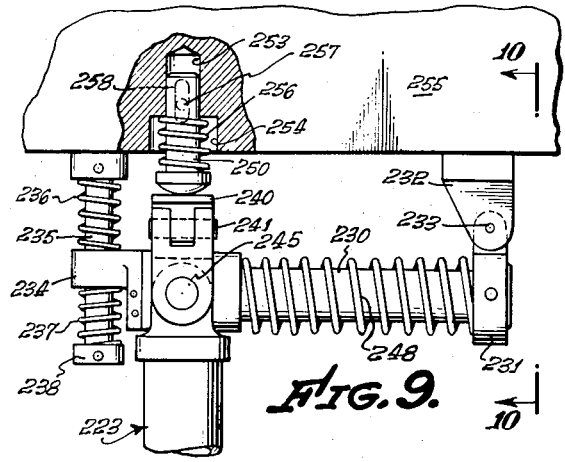
Fig. 9 is a view partly in side elevation and partly in section of structure that may be used to connect one end of the landing gear of Fig. 7 to an aircraft.

Fig. 1 shows an aircraft 20 having the usual retractable nose wheel 21 and equipped with a landing gear unit, generally designated by numeral 22, embodying the principles of the invention. The landing gear unit 22 is shown in its downwardly extended position for supporting the aircraft on the ground, the unit being retractable upward into a landing gear compartment 25 that is centrally positioned in the aircraft body and open onto the bottom of the body.

The landing gear unit 22 has a frame which may comprise a central longitudinal girder, generally designated by numeral 26, together with two beams 28 which are mounted by their forward ends on the opposite sides of the girder by hinge means 29. The girder 26 is provided with at least one landing wheel and in this instance is provided with a single forward landing wheel 30. This combination of a girder and at least one landing gear may be aptly termed a girder assembly. Each of the two hinged beams 28 carries a back wheel 32 at its rear or trailing end, it being contemplated that the two hinged beams will swing laterally outward from the girder for unfolding action of the unit to spread the two back landing wheels 32 apart.

The girder 26 is of triangular configuration in side elevation as seen in Fig. 2 and is of channel-shaped cross-sectional configuration as shown in Fig. 5. Thus the girder has a bottom web 34, and two upstanding parallel side walls 35. As shown in Fig. 3 the bottom web 34 is cut away at the forward end of the girder to form a fork for the forward landing wheel 30, which landing wheel is mounted on suitable axle means 37.

For the purpose of mounting the two back wheels 33, each of the two beams or laterally swingable frame members 28 is formed into an upright fork 41 at its rear end to carry an upright rod 42. Each of the two rearward landing wheels 32 is mounted on a corresponding axle 43 that is slidingly mounted on the corresponding rod 42 in a floating manner, the axle being positioned between an upper coiled spring 44 and a lower coiled spring 45.

A feature of this embodiment of the invention is the concept of linking the axles 43 to the girder 26 in such manner as to maintain the two rearward landing wheels 32 in the desired forward orientation of the wheels throughout a range of angles of the hinged beams 28 relative to the girder 26. Thus the hinged beams may be swung out to various degrees with assurance that the rearward landing wheels 32 will be directed forward.

For this purpose of keeping the two rear landing wheels 32 correctly oriented, the two axles 43 extend at their inner ends through longitudinal slots 49 in the side walls of the girder 26 and the inner ends of the axles are connected to a pair of corresponding links 50. As shown in Fig. 3 the two links 50 cross each other and are mounted on corresponding pivots 51 on opposite sides of the girder 26. Since the links 50 cross each other, the links must lie in different horizontal planes and therefore the inner ends of the two axles 43 are formed with upturned arms 52 of different lengths as may be seen in Fig. 5. Preferably, but not necessarily, each of the two axles 43 is of angular configuration in plan, as shown in Fig. 3, so that each axle in effect serves as a bell crank. It can be seen in Fig. 3 that the two links 50 maintain the rear landing wheels 32 in substantially parallel relationship and in the desired orientation throughout a wide angular range of movement of the two hinged beams 28.

Any suitable power means may be provided to actuate the two hinged beams 28 for spreading and retracting the two rear landing wheels 32. For example, as shown in Fig. 3, an electric motor 55 may be mounted inside the girder 26 on the bottom web 34 to actuate a rotary nut (not shown) on an elongated screw 56, thereby to cause the screw 56 to shift longitudinally as required. The end of the screw is connected to a link 57 which, in turn, is connected to a pivot 58 at the apex of a pair of actuating links 60. The outer ends of the two actuating links 60 are connected to the two hinged beams 28, respectively, by pivots 61 so that retraction of the screw 56 by the motor 55 causes the two hinged beams 28 to swing outward simultaneously to spread the two rear wheels 32 apart as indicated in Fig. 3. The two actuating links 60 extend through the previously mentioned longitudinal slots 49 in the side walls of the girder 26 in carrying out this spreading action.

Preferably suitable means is provided to releasably latch the two hinged beams 28 in their retracted or folded positions and to reduce the loads on the beam hinges. For this purpose detent members 64 may be mounted by brackets 65 on a pair of wings 66 on the girder for releasable engagement with the swinging ends of the two hinged beams 28. Each of the two detent members 64 is in the form of a pin slidably extending through the corresponding bracket 65 with a suitable spring 67 embracing the shank of the pin to urge a rounded head 68 of the pin into engagement with the corresponding hinged beam. The hinged beam has a shallow socket to seat this rounded head. The detent pin has a collar 69 to serve as stop means to limit downward movement of the detent pins when the detent pins are out of engagement with the pivoted beams. It is apparent that the detent members 64 will engage the two hinged beams 28 in a yielding manner that will be adequate to hold the two hinged beams in their folded positions in a vibration-free manner but, nevertheless, will not keep energization of the motor 55 from swinging the two hinged beams outward.

Any suitable means may be employed for mounting the landing gear frame on the aircraft for movement between an upper position inside the compartment 25 of the aircraft body and the lower extended position shown in Fig. 1. A feature of the preferred practice of the invention, however, is the concept of employing for this purpose a combination that includes a crank means for raising and lowering one end of the landing gear frame and a cable for raising and lowering the other end. Thus the present embodiment of the invention includes a crank means 70 together with an associated link means 71 for raising and lowering the front end of the girder 26 and includes a suitable cable 75 for raising and lowering the rear end of the girder. Also included in this combination for raising and lowering the girder is a guide means comprising a pair of shock-absorber arms 76.

As best shown in Fig. 4 the crank means 70 comprises two crank arms 78 on a pair of coaxial shafts 79, the crank arms being rigidly interconnected by a crank pin 80. The link means 71 that cooperates with the crank means 70 is formed with a transverse sleeve 82 at its upper end that rotatably embraces the crank pin 80. The other end of the link means 71 forms a fork 83 that straddles the forward landing wheel 30 and is connected to the two ends of the axle means 37 on which the wheel is mounted.

Any suitable means may be provided to actuate the crank means 70 to move the front end of the girder 26 between the lower extended position shown in full lines in Fig. 2 and the upper retracted position indicated by broken lines. For this purpose a worm gear 84 on one of the coaxial shafts 79 may be driven by a worm 85 that is actuated by a motor 86 through reduction gearing in a gear case 83. A feature of this arrangement is that the motor actuates the crank means 70 in an irreversible manner to lock the crank means at any position to which it may be turned by the motor.

A feature of this embodiment of the invention is the concept of actuating the cable 75 by means of a reel 90 that is mounted on one of the coaxial shafts 79 for rotation therewith. The reel 90 is of a diameter to pick up the cable 75 at the required rate to lift the rear end of the girder 26 to the desired height when the crank means 70 lifts the front end of the girder. As shown in Fig. 2, the cable 75 is led over a guide sheave 91 that is positioned to cause the cable to exert its upward pull on the girder in the same general direction as the travel of the front end of the girder.

The shock absorber arm 76 which is of a well-known construction comprising a cylinder 92 and a cooperating plunger 93 is pivotally connected to the girder 26 by a pin 94 and is pivotally connected to the aircraft body by a pin 95.

The manner in which this first embodiment of the invention serves its purpose may be readily understood from the foregoing description.

During normal flight of the aircraft the landing gear is retracted as indicated by the position of the two landing gear wheels shown in broken lines in Fig. 2 and at such time the two hinged beams 28 are folded against the sides of the girder 26 in engagement with the two detent members 64. In approaching a landing the pilot operates the motor 86 to swing the crank means 70 downward and to unwind the cable 75 to cause the girder 26 to be lowered to the extended position shown. When the landing wheels touch the ground, major shocks are taken by the shock absorber arm 76, and minor shocks are taken by the springs 44 and 45 associated with the rear landing wheels 32. After the landing wheels make contact with the ground and while the aircraft is being decelerated by the usual brakes, the motor 55 inside the girder 26 is energized to cause the two hinged beams 28 to be spread out in both lateral directions from the girder. Thus when the airplane comes to a stop, it is stabilized laterally by the two rear wheels 32.

Since the aircraft shown in Fig. 1 is provided with the nose wheel 21, the two rear wheels 32 are not needed for longitudinal stability on the ground and therefore the two hinged beams 28 may be swung to positions as much as 90 degrees away from the girder 26 to bring the two wheels 32 nearly abreast of the forward wheel 30. A feature of the invention, however, is that with the two hinged beams 28 swung to substantially less than 90 degrees, as shown in Fig. 3, the two wheels 32 will be positioned a substantial distance rearward from the forward wheel 30 and this distance may be adequate to give the airplane longitudinal stability on the ground. Thus the invention makes it possible to eliminate the nose wheel 21 entirely.

When the airplane takes off and becomes airborne, the motor 55 is energized to fold back the hinged beams 28 into their latched positions against the girder 26 and later energizes the motor 86 to cause the compactly folded landing gear to be drawn upward into the landing gear compartment 25 in the body of the aircraft. The landing gear folds into a relatively narrow structure of relatively small vertical dimension. The folding beams 28 may be relatively long to provide a relatively long support base for the airplane. A feature of the invention in this regard is that two of the described units may be mounted centrally on the airplane at substantial longitudinal spacing to extend the support base as much as may be desired. Thus it is a simple matter to provide a support base of sufficient length to eliminate any need for a separate nose wheel.

As heretofore indicated, the preferred practice of the invention is characterized by the concept of providing a control system for the two motors 55 and 86 which will be largely automatic and which will include safety means responsive to the imposition of the weight of the aircraft on the landing gear to keep the landing gear from being retracted into the body of the aircraft while the aircraft is on the ground. Such a control system and the associated weight-responsive means may take various forms in various practices of the invention. In the present embodiment of the invention, for example, the control system and the associated weight-responsive means are constructed and arranged as indicated by Fig. 6.

Figure 6:
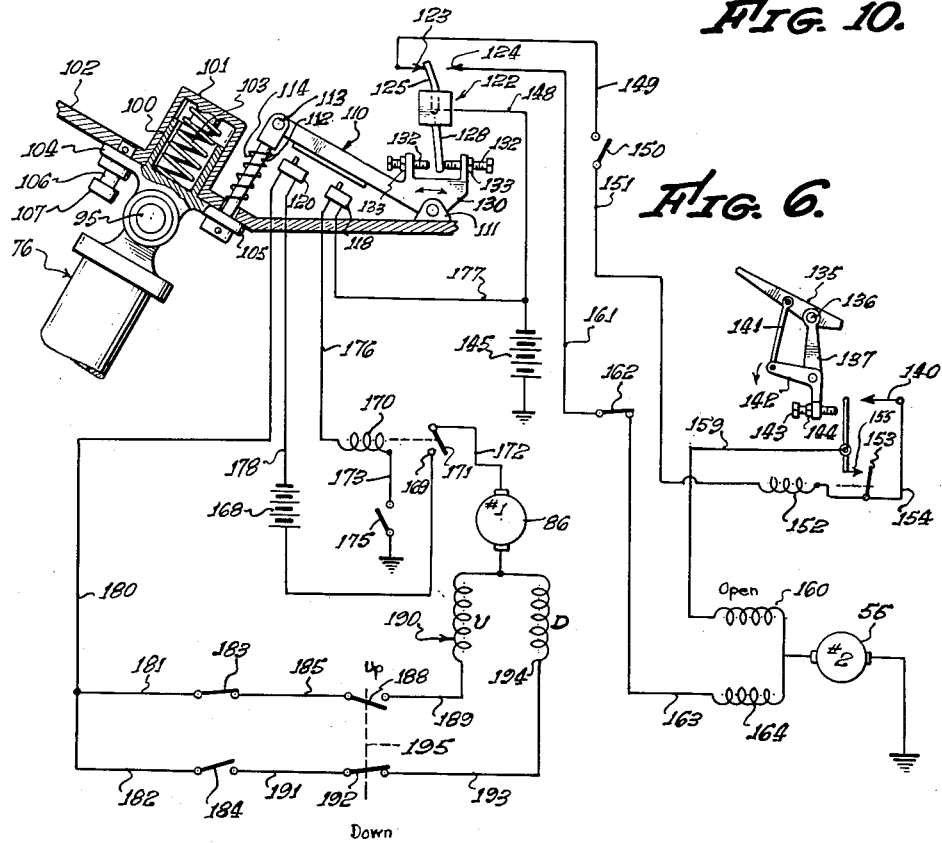
Fig. 6 shows a weight-responsive structure incorporated in the landing gear unit, this weight-responsive structure being shown in combination with a wiring diagram of a control system for the landing gear.

In Fig. 6 the cross pin 95 that connects the upper end of the shock absorber arm 76 to the body of the aircraft is not fixedly attached to the body but is movable relative thereto in a manner to seek one position when the airborne aircraft is supporting the landing gear and to seek an alternate position when the landing gear is supporting the aircraft on the ground. In the construction shown the cross pin 95 is carried by a hollow plunger 100 that telescopes slidably into a cylinder 101 formed in the upper wall 102 of the landing gear compartment 25. A suitable spring 103 inside the cylinder 101 urges the hollow plunger 100 downward to a lower limit position when the weight of the aircraft is off the landing gear, but when the weight of the aircraft is off the landing gear, the hollow plunger is moved upward to a second limit position against the opposition of the spring. The hollow plunger has a pair of ears 104 and 105 which abut against the under surface of the compartment wall 102 to limit the upward movement of the plunger. The lower limit position of the plunger is determined by a stop pin 106 which extends downward from the wall 102 through an aperture in the ear 104 and which has a head 107 that serves as a stop in cooperation with the ear.

The movement of the hollow plunger 100 between its two limit positions is functionally related to the control system by means of an arm 110 that is pivotally mounted on a bracket 111 on the upper side of the compartment wall 102. An operating rod 112 is slidingly mounted on the ear 105 and extends upward through an aperture in the wall 102, the upper end of the operating rod being connected to the arm 110 by a pivot 113. A suitable spring 114 is mounted on the operating rod 112 in compression against the wall 102 to urge the arm 110 upward thereby to cause the arm to follow the up and down movements of the hollow plunger 100.

The weight-responsive arm 110 controls two normally open switches 118 and 120 which are closed in response to downward movement of the arm relative to the aircraft when the aircraft lifts its weight off the landing gear. Preferably, the two switches 118 and 120 close in sequence in response to the downward movement of the arm 110, the switch 118 closing first.

The control system also includes a double-throw switch 122 which has two alternate positions against two alternate contacts 123 and 124 respectively. The switch arm 125 of the switch 122 is controlled by a toggle mechanism in a well-known manner in response to actuation of an operating arm 128. When the operating arm 128 is pushed rightward as viewed in Fig. 6, it snaps the switch arm 125 against the contact 123 and when it is pushed in the opposite direction, it snaps the switch arm to its alternate position against the contact 124.

This double throw switch 122 is also responsive to the reimposition of the weight of the aircraft on the landing gear and for this purpose may be operated by the weight-responsive arm 110. In the construction shown, the arm 110 has a bracket 130 unitary therewith in which is mounted a pair of opposed adjustable screws 132 immobilized by lock nuts 133. It is apparent that the two screws 132 may be adjusted to actuate the switch 122 in response to the movement of the hollow plunger 100 between its two limit positions.

The control system shown in Fig. 6 is also functionally related to the brake system of the landing gear and for this purpose the usual brake pedal 135 that is mounted by a pivot 136 on a support 137 is adapted to close a normally open switch 140 in the control system. In the arrangement shown in Fig. 6 the brake pedal 135 is connected by a link 141 with a bell crank 142 which carries an adjustable screw 143. The screw 143 is held at a selected position of adjustment by means of a lock nut 144, the adjustment being such that the brake pedal 135 closes the switch 140 only when the brake pedal is depressed firmly for substantial braking action in the final action of bringing the aircraft to a stop.

The motor 55 that controls the spreading and contracting of the hinged beams 28 is energized by a suitable source of EMF represented by a battery 145, one terminal of the battery and one terminal of the motor being grounded as shown. The other side of the battery 145 is connected by a wire 148 with the switch arm 125 of the double throw switch 122. The contact 123 is connected by a wire 149 to a limit switch 150 that is opened by one of the two hinged beams 28 when the two hinged beams are spread apart to the desired maximum positions of unfoldment.

The limit switch 150 is connected by a wire 151 with a relay coil 152 which has a normally open contact 153. The second side of the relay coil 152 is connected to the contact 153 and is also connected by a wire 154 to one side of the normally open brake pedal switch 140. The normally open relay contact 153 closes against a fixed contact 155 and both the fixed contact 155 and the second side of the brake pedal switch 140 are connected by a wire 159 to the field coil 160 of the motor 55 to complete a circuit that will cause the motor to operate in a direction to spread the two hinged beams 28 apart.

The second contact 124 of the double throw switch 122 is connected by a wire 161 with a limit switch 162 that is opened by one of the hinged beams 28 when the two hinged beams are folded to their limit positions against the girder 26. The second side of the limit switch 162 is connected by a wire 163 with the second field coil 164 of the motor 55 to complete a circuit to cause retraction or folding action of the two hinged beams 28.

The motor 86 that powers the downward extension and upward retraction of the landing gear is energized by a suitable source of EMF represented by a battery 168. One side of the battery 168 is connected to the fixed contact 169 of a normally open relay comprising a relay coil 170 and a movable relay contact 171. The movable relay contact 171 is connected by a wire 172 to one side of the motor 86.

The relay coil 170 is connected by a wire 173 with a grounded switch 175. The other side of the relay coil 170 is connected by a wire 176 with the previously mentioned switch 118 and the second side of the switch 118 is connected by a wire 177 to the battery 145. Thus when the switch 118 is closed by the weight-responsive arm 110, the relay coil 170 is energized to place one side of the battery 145 in communication with the motor 86.

The second side of the battery 168 is connected by a wire 178 to the previously mentioned switch 120. The second side of the switch 120 is connected to a wire 180 which in turn is connected by wires 181 and 182 to a pair of limit switches 183 and 184. Limit switch 183 opens in response to complete upward retraction of the landing gear by the motor 86 and limit switch 184 opens in response to complete downward extension of the landing gear.

Limit switch 183 is connected by a wire 185 to an "up" switch 188 which in turn is connected by a wire 189 to the field coil 190 of the motor 86 in the circuit for energizing the motor for rotation in the direction to retract the landing gear upward into the body of the aircraft. The second limit switch 184 is connected by a wire 191 with a "down" switch 192 and the down switch in turn is connected by a wire 193 to the second field coil 194 of the motor 86 to complete a circuit for energizing the motor in the direction to lower the landing gear out of the compartment 25. The two switches 188 and 192 are operatively interconnected as indicated by the dotted line 195 for operation in unison in opposite respects thus forming a master switch. Movement of the master switch 195 to one position closes the motor circuit through field coil 190 to retract the landing gear upward and movement of the master switch to its other position closes the motor circuit through field coil 194 to lower the landing gear.

The various components of the control system are shown in Fig. 6 in the positions assumed when the aircraft is resting on the ground with the landing gear downwardly extended from the body of the aircraft as well as laterally extended to spread the two rear landing wheels 32 apart. It will be noted that since the weight of the aircraft is carried by the landing gear, the weight-responsive arm 110 is in its upper position so that both switches 118 and 120 are open. It will also be noted that with the weight-responsive arm 110 at its upper limit position, the switch arm 125 of the double-throw switch 122 is against the contact 123.

Since the switch 118 is open, the relay coil 170 is de-energized and its movable contact 171 is in open position to keep the motor 86 from being energized. Thus switch 118 is, in effect, weight-responsive to make it impossible for the control system to be inadvertently operated to retract the landing gear upward into the body of the aircraft. Since the switch arm 125 of the double-throw switch 122 is spaced away from the fixed contact 124, the other motor 55 cannot be energized through its field coil 164 to cause the two hinged beams 28 to fold against the girder 26. With the two hinged beams 28 in their extended or unfolded positions, the limit switch 150 is open and the second limit switch 162 is closed. The fact that the two hinged beams 28 are in their extended or unfolded positions also results in the switch 175 being open. The control switch comprising the interconnected switches 188 and 192 is in its "down" position and since the landing gear is in its downwardly extended position, the limit switch 184 is open and the other limit switch 183 is closed.

Prior to take-off the pilot may preset the control system for automatic retraction of the landing gear simply by moving the master switch 195 to its "up" position. This shifting of the master switch 195 to its "up" position does not result in energization of the motor 86 because the motor circuit is broken both by the normally open switch 120 and by the normally open contact 171 that is controlled by the relay coil 170. As the aircraft in making the take-off lifts its weight from the landing gear to become airborne, the hollow plunger 100 drops to its lower limit position to result in closing of both of the normally open switches 118 and 120 and to result also in operation of the double-throw switch 122 to cause the switch arm 125 to shift from the contact 123 to the contact 124. The shifting of the switch arm 125 to the contact 124 completes the circuit through the field coil 164 of the motor 55 to cause the motor to be energized for retraction of the hinged beams 28 laterally inward against the girder 26. When the two hinged beams reach their fully retracted positions, they open the limit switch 162 to de-energize the motor 55.

The closing of the switch 118 by the weight-responsive arm 110 and the subsequent closing of the switch 175 in response to the folding of the two hinged beams 28 results in energization of the relay coil 170 to close the movable contact 171 against the fixed contact 169. The subsequent closing of the switch 120 by the weight-responsive arm 110 completes the motor circuit through the limit switch 183 and the "up" switch 188 to cause the motor 86 to retract the landing gear upward into the compartment 25 in the body of the aircraft.

It is apparent that the removal of the weight of the aircraft from the landing gear causes the two hinged beams 28 to be folded automatically against the girder 26 when the aircraft leaves the ground. It is further apparent that the presetting of the master switch 195 in its "up" position results in energization of the motor 86 to retract the landing gear upward in response to the closing of the relay contact 171 when the two hinged beams reach their fully folded positions. Thus the presetting of the master switch 195 results in a fully automatic cycle of operation for folding and retracting the landing gear when the aircraft leaves the ground. If the master switch 195 is not preset in its "up" position, the two hinged beams 28 will fold back against the girder 26, but the landing gear will not be retracted upward into the body of the aircraft. After an interval of time, however, the pilot will move the master switch 195 in its "up" position to result in retraction of the landing gear upward into the compartment 25.

When making an approach to a landing, the pilot will move the master switch 195 to its "down" position to result in energization of the motor 86 to lower the landing gear to the point where the limit switch 184 opens. The two hinged beams 28 will not unfold, however, because the landing gear does not carry the weight of the aircraft and, therefore, the switch arm 125 of the double throw switch 122 is against the fixed contact 124. When the weight of the aircraft is imposed on the landing gear by the contact of the wheels with the ground, the switch arm 125 swings to the contact 123. The coil 160 of the motor 55 is not energized by this shift of the switch arm 125 because both the brake pedal switch 140 and the movable relay contact 153 are in their open positions. When the brakes are applied, however, the brake pedal switch 140 is closed to complete the circuit through the field coil 160 of the motor 55 to cause the two hinged beams 28 to be unfolded or spread apart.

The switch 140 does not close in response to the usual preliminary relatively light depressions of the brake pedal but does close when the brake pedal is firmly depressed. Once the brake pedal switch 140 closes, the relay coil 152 attracts the movable contact 153 to lock the motor circuit independently of the operation of the brake pedal. As a result, the two hinged beams 28 swing laterally outward to spread the back wheels 32 apart while the aircraft is being slowed down in its landing run with its weight imposed on the landing gear.

The second embodiment of the invention shown in Figs. 7 to 10 has certain components in common with the first described embodiment of the invention, as indicated by the use of corresponding numerals to indicate corresponding parts. Thus a motor 86 actuates a crank means 70 in the previously described manner to raise the front end of the landing gear and at the same time actuates a reel 90 to operate a cable 75 for raising the rear end of the landing gear.

The landing gear includes a main frame or girder 200 and two hinged beams 201 that are pivotally mounted thereon by hinge means 202. The girder is provided with a front landing wheel 203 and a back landing wheel 204 and the two hinged beams 201 carry a pair of smaller side wheels 205. It will be noted that the axis of the hinge means 202 is inclined forward to carry the two side wheels 205 downward to ground level from elevated positions when the two hinged beams 201 are unfolded, the unfolded positions of the wheels being at 206. The upper end of the link 210 is in the form of a clevis 212 that straddles a sleeve 213 on the wrist pin 80 of the crank means 70. The clevis 212 is pivotally connected to the rotary sleeve 213 at diametrically opposite points by suitable pivot pins 214.

A forward shock absorber arm 215 is pivotally connected at its lower end to the previously mentioned pivot pin 211 of the girder 200 and at its upper end forms a clevis 216 that is connected by a pivot pin 220 to a body 221. The body 221 is in turn rotatably mounted on a cross pin 222 that corresponds to the cross pin 95 of the first embodiment of the invention and may function in the same manner.

The rear end of the girder 200 is connected to the body of the aircraft by a pair of parallel shock absorber arms 223. The lower ends of the two shock absorber arms 223 are journalled on a shaft or cross rod 224 on the girder 200 and the upper ends of the two shock absorber arms 223 are connected to the aircraft body by a pivot means having an axis longitudinally of the aircraft, which pivot means is preferably movable longitudinally as well as up and down through a limited range relative to the aircraft. The construction of such a pivot means is shown in Figs. 9 and 10.

Figure 10:
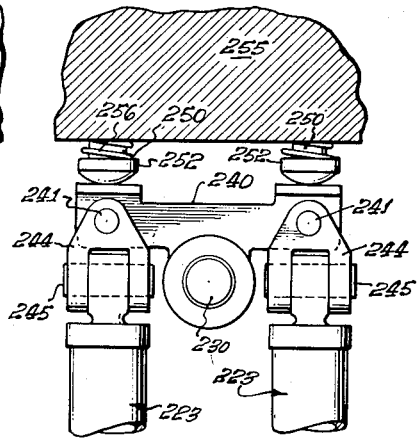
Fig. 10 is an end elevation of the structure of Fig. 9 as viewed along the line 10—10.

The pivot means shown in Figs. 9 and 10 includes a longitudinal shaft 230 which is pivotally mounted at its rear end and is floatingly mounted at its forward end for limited upward and downward movement. Thus the rear end of the shaft 230 has fixed thereto a collar 231 which is connected to a fixed bracket 232 by a transverse pivot pin 233. The forward end of the shaft 230 has fixed thereto a collar 234 that loosely embraces a vertical guide rod 235 between two compression springs 236 and 237 on the guide rod, the lower end of the guide rod being provided with a stop collar 238.

Slidingly mounted on the longitudinal shaft 230 is a suitable yoke 240 which extends in opposite lateral directions from the shaft and which carries pivot pins 241 on its opposite ends. Suitable clevis members 234 are pivotally mounted on the pivot pins 241 and in turn carry pivot pins 245 at right angles thereto, the upper ends of the two shock absorber arms 223 being pivotally mounted on the pivot pins 245. Thus the two shock absorber arms 223 are free to swing forward and rearward on the pivot pins 245 and are free to swing laterally on the pivot pins 241. It is also to be noted that the yoke 240 may tilt in opposite lateral directions about the axis of the longitudinal shaft 230.

The yoke 240 carrying the upper ends of the two shock absorber arms 223 is urged towards its forward position on the longitudinal shaft 230 by a suitable spring 248 that embraces the shaft. When the landing gear is in its downward extended position shown in full lines in Fig. 7, the spring 248 holds the yoke 240 in its forward position with the two shock absorber arms 223 approximately vertical as viewed from one side. When the landing gear is retracted upwardly into the aircraft body, the yoke 240 is forced to a rearward position on the longitudinal shaft 230 in opposition to the spring 248. This longitudinal shift of the upper ends of the two shock absorber arms 223 makes it possible to keep the landing gear mechanism relatively compact. The spring 248 not only provides for automatic shift of the two shock absorber arms to their forward positions when the landing gear is extended downward but also stores energy for causing such shift.

At the forward position of the yoke 240 when the landing gear is extended downward from the body of the aircraft, the yoke makes contact with a pair of downwardly directed plungers 250 having rounded heads 252 for abutment against the yoke. Each of the plungers 250 is mounted in a bore 253 in a recess 254 on the underside of a relatively fixed support member 255. A suitable spring 256 mounted on each of the plungers seats in the recess 254 and presses against the rounded head 252 which serves to urge the plunger downward. To limit the downward movement of the two plungers 250 when the yoke 240 is spaced away from the plungers, each of the plungers has a small cross pin 257 which extends into a vertical slot 258 in the support member 255.

This second embodiment of the invention functions in the same general manner as the first described embodiment and may be operated by the same control system. When the landing gear is extended downward in preparation for contacting the ground on approaching a landing, the landing gear is free to seek a vertical position by virtue of the described universal joints at the upper ends of the link 210, the upper end of the forward shock absorber arm 215, and the upper ends of the rear shock absorber arms 223. At this time, the two spring-loaded plungers 250 press downward on the opposite ends of the yoke 240 in a manner that stabilizes the landing gear against side sway but does not prevent the landing gear from seeking the vertical position desired for initial contact with the ground.

During the approach to a landing the longitudinal shaft 230 is held at its lower position by the weight of the landing gear, but as the weight of the aircraft is shifted to the landing gear, the longitudinal shaft 230 is swung upward to force the two spring-loaded plungers 250 to their upper limit positions. Thus the freedom for lateral pivotal movement of the landing gear relative to the aircraft disappears as the weight of the aircraft settles solidly onto the two arms of the yoke 240. It is apparent that the aircraft may be tilted laterally at the beginning on a landing run but will settle down onto the landing gear to take a normal upright position as the landing run continues.

Figs. 11 and 12 show a girder assembly that may be substituted for the girder assembly 200 of the second embodiment of the invention. The hinged beams 201 that carry the side wheels 205 are omitted from Fig. 11 for simplification of illustration.

The construction shown in Fig. 11 comprises a main frame or girder 265 which carries a forward dirigible wheel 266 and a rearward dirigible wheel 267. Each of these two wheels is mounted on an upright fork 268 having a shank 269 that is journalled in a pair of spaced bearings 270 on the girder 265. Each of the shanks 269 carries an arcuate rack member 271 which is in mesh with a pinion 272. The pinion 272 is on the upper end of a rocker shaft 275 that is journalled in a fixed vertical sleeve 276. The lower end of the rocker shaft 275 carries a rocker arm 277, and this rocker arm is operatively connected to the piston rod 278 of a power cylinder 280. Fluid under pressure is delivered to the two cylinders 280 by remote control to cause either or both of the two wheels 266 and 267 to be turned to various directions as desired as may be required for landing in cross winds or for steering the aircraft on the ground.

Fig. 11 also illustrates how a landing hook 260 may be mounted on a centralized landing gear instead of being mounted on the body of an aircraft. The landing hook 284 is slidingly mounted in a body 285 that is pivotally mounted on the girder 265 and is controlled by an arm 286. A suitable spring 287 on the landing hook between the body 285 and a head 288 on the butt end of the hook normally holds the hook in a forward longitudinal position as shown in Fig. 11. The arm 286 is connected to a piston rod 290 that responds to fluid pressure in a power cylinder 291. Normally the landing hook 284 is in the position shown in Fig. 11 but may be rocked downward by energization of the power cylinder 291 as indicated by broken lines. When the downwardly inclined landing hook makes engagement to brake the forward movement of the aircraft, the spring 287 functions as a shock absorber.

Figs. 13 and 14 show the construction of another girder and wheel assembly that may be substituted in the second embodiment of the invention. This girder assembly has the feature of being longitudinally extendible as well as laterally extendible. The landing gear, when downwardly extended from the aircraft body, may be spread longitudinally to provide a relatively extensive longitudinal support base by the aircraft, in addition to being spread laterally to provide a relatively wide support base.

In this embodiment of the invention the girder 295 has a forward landing wheel 296 and a back landing wheel 297 and each of these wheels is mounted on a suitable fork 298 that may be termed a crank since it may be either folded longitudinally into the interior of the girder or may be unfolded to extend longitudinally from the end of the girder. In the construction shown, each of the cranks 298 has a sleeve 300 unitary therewith and this sleeve is fixedly mounted on a transverse shaft 301 that is journalled in a pair of bearings 302 in the girder. The outer end of each of the two shafts 301 carries a worm gear 303 in mesh with a corresponding worm 304. A suitable central motor 305 has a shaft 306 extending in both directions therefrom with the two worms 304 mounted on the opposite ends of the shaft. The two worms have opposite pitch to cause the two cranks 298 to move inwardly and outwardly simultaneously with respect to the girder 295.

The extended positions of the two wheels 296 and 297 are shown in full lines in Fig. 13 and the retracted or folded positions are shown in broken lines. It is apparent that the motor 305 will swing the wheels between their two positions and that the worm gearing is irreversible to immobilize the two cranks 298 in their extended positions.

Fig. 15 shows another girder assembly that may be substituted in the second form of the invention. In Fig. 15 the girder 310 has a conventional forward wheel 311 and has a back wheel 312 that is movable between a retracted position shown in solid lines and a rearward extended position shown in broken lines. The back wheel 312 is carried by a fork 315 which is rigidly mounted on the end of a heavy piston rod 316. The piston rod 316 extends from a power cylinder 317 through a sleeve 318 at the rear end of the girder. The power cylinder 317 may be actuated by remote control to extend the back wheel 312 rearward after the landing gear has been extended downward from the body of the aircraft.

Since both of the forms of the invention shown in Figs. 13 and 15 provide for a relatively extensive longitudinal support base for the aircraft, either of these two forms may be used without the necessity of adding a nose wheel.

My description in specific detail of selected embodiments of the invention by way of example and to illustrate the principles involved will suggest various changes, substitutions and other departures from my disclosure that properly lie within the spirit and scope of the appended claims. For example, skis, floats, or other means to support the aircraft may be substituted for the landing wheels.

I claim:
1. A landing gear unit for an aircraft, comprising:

a landing gear frame; a plurality of at least three means mounted on said frame for contact with underlying surfaces to support the aircraft thereon, said frame being laterally expansible to increase the horizontal spacing of said plurality of surface-contacting means from a normal contracted spacing when the aircraft is in flight to expanded spacing for landing, said plurality of surface-contacting means at said expanded spacing being spread apart both longitudinally of the aircraft and laterally of the aircraft for supporting the aircraft with both longitudinal and lateral stability; means attaching said landing gear frame to said aircraft for movement between an upper retracted position inside the body of the aircraft and a lower extended position outside the body; a first power means to move said frame between its upper retracted position and its lower extended position; and a second power means to expand and contract said frame for spreading said plurality of surface-contacting means from their normal contracted spacing to their expanded spacing and vice versa.

2. A landing gear unit as set forth in claim 1, in which the undersides of said plurality of surface-contacting means define a plane at their positions of expanded spacing; and in which the paths of movement of the surface-contacting means between their normal contracted positions and their expanded positions lie above said plane whereby said surface-contacting means may be contracted in spacing while the landing gear unit is partially supporting the aircraft on take-off without forcing said second power means to exert lifting force on the aircraft, and may be laterally extended in spacing while the landing gear unit is at least partially supporting the aircraft during a landing without forcing said second power means to exert lifting force on the aircraft.

3. A landing gear unit as set forth in claim 1, in which said means for attaching said landing gear to said aircraft includes a forward means connected to a forward portion of said frame and a rearward means connected to a rearward portion of the frame; and in which said forward and rearward means hold said frame substantially horizontal at both the upper and lower positions of the frame.

4. A combination as set forth in claim 1 which includes a crank interconnecting the body of the aircraft and the landing gear frame for raising and lowering one end of the frame; an arm pivotally connected both to the aircraft and to the landing gear frame to guide the landing gear frame between its upper retracted position and its lower extended position and to cooperate with said crank to hold the landing gear frame at its lower extended position a cable connected to the landing gear frame for cooperation with said crank in raising and lowering the frame; and a reel to control said cable, said crank and reel being operated by said first-mentioned power means.

5. A combination as set forth in claim 4 which includes a shaft carrying said reel, said crank being mounted on said shaft, said shaft being actuated by said first-mentioned power means.

6. A combination as set forth in claim 1 in which said attaching means pivotally suspends said landing gear frame at the lower extended position of the frame with freedom for the landing gear frame to swing laterally of the aircraft whereby the landing gear frame gravitationally seeks an upright position normal to the ground when the aircraft approaches a landing in a laterally tilted position.

7. A combination as set forth in claim 1 which includes: a landing hook mounted on said frame for movement between a normal upper position and a lower effective position; and remotely controlled means to move said landing hook from its normal position to its effective position.

8. A combination as set forth in claim 1 which includes a brake system for at least some of the wheels on said landing gear frame and which includes means to energize said second power means for lateral extension of said frame in response to operation of said brake system.

9. A combination as set forth in claim 1 which includes means responsive to lateral extension of said frame to prevent energization of said first power means for upward retraction of the frame when the frame is laterally extended.

10. A combination as set forth in claim 9 in which said first power means is provided with a control system which includes a normally open switch to prevent energization of said first power means, said switch being responsive to lateral retraction of said frame.

11. A landing gear unit for an aircraft, comprising: a main landing gear frame; means attaching said landing gear frame of said aircraft for movement between an upper retracted position inside the body of the aircraft and a lower extended position outside the body; a pair of frame members hingedly connected to said main frame to swing out in opposite lateral directions from normally contracted positions to laterally spread positions on both sides of the main frame; at least one means mounted on said frame in position to at least partially support the aircraft when said pair of frame members are in their normal contracted positions; and two additional means mounted respectively on the swinging ends of said pair of frame members to support the aircraft, the hinge axes of said pair of frame members being oriented to position the paths of swinging movement of said two additional support means at at least the elevation of said one supporting means whereby said pair of frame members may be extended laterally and contracted laterally without exerting lifting force on the aircraft when said one supporting means is at least partially supporting the aircraft; a first power means to move said frame between its upper retracted position and its lower extended position; and a second power means to spread and contract said pair of frame members.

12. A landing gear as set forth in claim 11 in which the hinge axes of said two hinged members are inclined from the vertical to position said last-mentioned support means above ground level when said hinged frame members are contracted and to position said wheels at ground level when the hinged members are laterally extended.

13. A landing gear for an aircraft comprising: a main frame movable between an upper ineffective position and a lower effective position; a pair of hinged frame members on opposite sides of said main frame to swing laterally in opposite directions relative to the main frame in general horizontal planes; power means to swing said frame members relative to said main frame; at least one landing wheel mounted on said main frame to at least partially support the aircraft when said pair of frame members are in their contracted positions while said main frame is in its lower effective position; axles pivotally mounted on the swinging ends of said frame members for rotation relative thereto about upright axes; landing wheels carried by said axles respectively; and links interconnecting said axles and said main frame to rotate said axles about their axes during the swinging movement of said frame members thereby to hold said landing wheels on the axles in planes substantially longitudinal of the aircraft throughout a range of positions of each of the two frame members relative to said main frame.

14. A landing gear unit for an aircraft comprising: a landing gear frame; at least two wheels mounted on said landing gear frame, said landing gear frame being extensible in both lateral directions to spread said two wheels apart; means pivotally suspending said landing gear from said aircraft for rocking movement about an axis longitudinally of the aircraft, said suspension means being extendable and retractable for movement of the landing gear frame between an upper retracted position inside the body of the aircraft and a lower extended position outside the body, said pivotal suspension means having freedom for a limited range of movement up and down relative to the aircraft whereby the suspension means seeks a lower limit position relative to the aircraft as the aircraft approaches a landing with the aircraft tilted laterally and is forced to an upper position relative to the aircraft by the weight of the aircraft when the leading gear makes contact with the ground; and means on the aircraft for abutment with said suspension means on opposite sides of said axis at the upper position of the suspension means to stabilize the aircraft on the landing gear when the weight of the aircraft is imposed thereon.

15. A landing gear unit for an aircraft comprising: a landing gear frame; at least two wheels mounted on said landing gear frame; means including a crank and a link connected thereto for suspending one end portion of said frame from the aircraft and for raising and lowering said end portion relative to the aircraft; means to lift and lower the other end portion of said frame; shock absorber means pivotally connected at one end to said other end portion of said frame; pivot means connecting the other end of said shock absorber means with the body of the aircraft, said pivot means being mounted on the aircraft for movement longitudinally of the aircraft between a first position with the landing gear frame lowered and a second position with the landing gear frame raised; means to guide said pivot between said first and second positions; and yielding means urging said pivot means along said guide means towards said first position to shift the pivot means to said first position automatically when the landing gear frame is lowered.

16. A combination as set forth in claim 15 which includes a longitudinal shaft on which said pivot means is rotatably mounted, at least one end of said shaft being vertically movable to permit the shaft to drop to a relatively low position when the landing gear frame is suspended from the aircraft and to permit the shaft to be moved to an upper position by imposition of the weight of the aircraft on the landing gear frame.

17. A combination as set forth in claim 16 in which the landing gear frame is free to rotate about the axis of said shaft when suspended from the aircraft in downwardly extended position out of contact with the ground and which includes means on the aircraft on opposite sides of the axis of said shaft to prevent pivotal movement of the landing gear frame about the axis of the shaft when said shaft is in its upper position.

18. A landing gear unit for an aircraft comprising: a landing gear frame; means attaching said landing gear frame to said aircraft for movement between an upper retracted position inside the body of the aircraft and a lower extended position outside the body; power means to move said frame between its upper retracted position and its lower extended position; a pair of wheels on said frame comprising a forward wheel and a rearward wheel, said frame being longitudinally extensible and retractable to increase the distance between said two wheels when said frame is in its lower extended position; a second pair of wheels on said frame, said frame being extensible in both lateral directions to spread said last-mentioned wheels apart when said frame is in its lower extended position; and power means to extend and retract said frame both longitudinally and laterally.

19. A combination as set forth in claim 18 in which at least one of said first pair of wheels is mounted on said frame by power-actuated crank means, said crank means being rotatable between a retracted position with the first pair of wheels relatively close to each other and an extended position with the first pair of wheels relatively distant from each other.

20. A combination as set forth in claim 18 which includes a longitudinal member slidingly mounted on said frame, one of the wheels of said first pair of wheels being mounted on said member; and which includes means to extend said member for spreading said first pair of wheels apart.

21. A landing gear unit for an aircraft comprising: a landing gear frame; means attaching said landing gear frame to said aircraft for movement between an upper retracted position inside the body of the aircraft and a lower extended position outside the body; power means to move said frame between its upper retracted position and its lower extended position; a pair of dirigible wheels on said frame comprising a forward wheel and a rearward wheel; a second pair of wheels on said frame, said frame being extensible in both lateral directions to spread said second pair of wheels apart from contracted positions above the level of said dirigible wheels to extended positions on substantially the same level as the dirigible wheels; power-actuated means for steering said dirigible wheels under remote control; and power-actuated means to extend and retract said frame laterally to spread and retract said second pair of wheels.

22. A landing gear unit for an aircraft comprising: a landing gear frame; at least two wheels mounted on said landing gear frame; means attaching said landing gear frame to said aircraft for movement of the landing gear frame between an upper retracted position inside the body of the aircraft and a lower extended position outside the body, said attaching means having freedom for a limited range of up and down movement relative to the aircraft to move up in response to imposition of the weight of the aircraft on the landing gear and to move down in response to removal of the weight; power means to move said frame between its upper retracted position and its lower extended position; and means responsive to movement of said attaching means to its upper limit position to prevent retraction of said landing gear frame into the body when the weight of the aircraft is imposed on said frame.

23. A combination as set forth in claim 22 in which said power means comprises an electric motor; and in which said preventing means comprises a switch responsive to said attaching means to prevent energization of said motor.

24. A landing gear unit for an aircraft comprising: a landing gear frame; at least two wheels mounted on said landing gear frame, said landing gear frame being extensible in both lateral directions to spread said two wheels apart; means attaching said landing gear frame to said aircraft for movement of the landing gear frame between an upper retracted position inside the body of the aircraft and a lower extended position outside the body, said attaching means having freedom for a limited range of up and down movement relative to the aircraft; at least one landing wheel mounted on said main frame to at least partially support the aircraft when said pair of frame members are in their contracted positions while said main frame is in its lower effective position; power means to move said frame between its upper retracted position and its lower extended position; a second power means to laterally extend and retract said frame to spread and retract said two wheels; and means responsive to movement of said attaching means to its lower limit position to actuate said second power means for lateral retraction of said frame whereby said frame is automatically laterally retracted in response to the lifting of the weight of the aircraft from the landing gear frame on takeoff.

25. A landing gear unit as set forth in claim 24, which includes means responsive to lateral contraction of said frame to actuate said first-mentioned power means to move said frame from its lower extended position to its upper retracted position whereby said frame is laterally contracted and upwardly retracted automatically in sequence in response to the lifting of the weight of the aircraft from the landing gear frame.

References Cited in the file of this patent

UNITED STATES PATENTS

| | | |
|---|---|---|
| 1,485,780 | Fales | Mar. 4, 1924 |
| 1,855,861 | Manor | Apr. 26, 1932 |
| 2,184,260 | Sutton | Dec. 19, 1939 |
| 2,392,892 | Ward | Jan. 15, 1946 |
| 2,400,587 | Livers | May 21, 1946 |
| 2,446,700 | Giles | Aug. 10, 1948 |
| 2,497,880 | Gassner | Feb. 21, 1950 |
| 2,538,388 | Sievers | Jan. 16, 1951 |

FOREIGN PATENTS

| | | |
|---|---|---|
| 561,456 | Great Britain | May 22, 1944 |
| 584,330 | France | Nov. 18, 1924 |
| 658,195 | Great Britain | Oct. 3, 1951 |
| 866,042 | France | Mar. 31, 1941 |
| 1,039,384 | France | May 13, 1953 |